Figure 1:
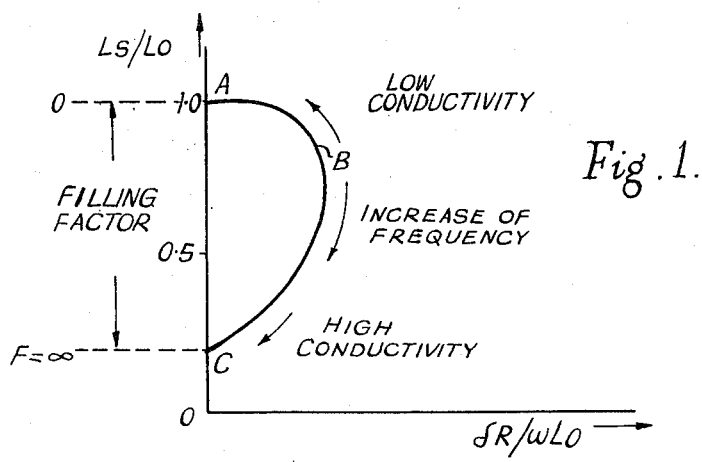

United States Patent Office 3,159,784
Patented Dec. 1, 1964

3,159,784
EDDY CURRENT TESTING APPARATUS HAVING MEANS TO RELATE ELECTRICAL CHARACTERISTICS OF A PICKUP UNIT TO PHYSICAL PROPERTIES OF A SPECIMEN
Roy William George Haslett and Eric Lionel Freeman, Hillington, Glasgow, Scotland, assignors to Kelvin & Hughes Limited, Hillington, Glasgow, Scotland, a British company
Filed Dec. 14, 1960, Ser. No. 75,864
Claims priority, application Great Britain Dec. 16, 1959
6 Claims. (Cl. 324—34)

The present invention, constituting a modification of the invention claimed in British Patent No. 836,723 concerns apparatus for the non-destructive testing of materials using electromagnetic methods.

It is well known that when a conductor is placed in a high frequency alternating magnetic field, eddy currents are set up in the conductor, and the magnitude, phase and distribution of these currents are substantially determined by certain physical characteristics of the conductor, e.g. its size, shape, conductivity, purity or hardness, or by the presence of porosity or flaws. These currents and their variations may then be detected and measured from changes in the magnetic field which are detectable outside the conductor. In this way a number of physical characteristics of the conductor may be determined.

Further the depth of penetration of the eddy currents into the test piece is determined by the frequency of the alternating exciting field. As the frequency is raised, there is a greater concentration of eddy currents near the surface of the test piece.

The exciting magnetic field may be produced by an alternating current flowing through a coil and this coil is arranged to surround the conductor. Measurements can then be made of changes in the electrical impedance across the terminals of the coil in order to detect the changes in the magnetic field caused by the conductor.

It it well known that this electrical impedance has two components, resistance and reactance and these may be measured separately. A relationship exists between the resistance and the inductance on the one hand and the amplitude and phase of the magnetic field to which the coil is subjected on the other hand, such that with knowledge of any two of these quantities, it is possible to determine the other two. As has been previously pointed out, this magnetic field is modified by the eddy currents and these, in turn, are dependent on the physical characteristics of the conductor. In this way, when the conductor is of a simple shape, for instance a cylindrical rod, it is possible to relate mathematically the resistance and inductance of the coil to the physical properties of the conductor.

Dr. Fritz Förster of Germany has made impedance calculations and experimental measurements of the induction of eddy currents in materials of various kinds and shapes. These calculations may be expressed graphically in very general terms and in their graphical form are capable of application to many testing problems. The Förster graph for one metal is shown in FIG. 1 of the accompanying drawings, this graph having been drawn in accordance with the following scheme:

Let
$L_0$=the inductance of an empty coil
$L_s$=the inductance of the coil when surrounding a metal rod at a frequency F
$R_0$=the resistance of the empty coil
$R_0+\delta R$=the resistance of the coil when surrounding the metal rod at the frequency F The Förster graph shown in FIG. 1 is then obtained by plotting $$\frac{L_s}{L_0}$$

as ordinate against $$\frac{\delta R}{\omega L_0}$$

as abscissa where $\omega=2\pi F$. From this graph, it is seen that at $F=0$, $$\frac{L_s}{L_0}=1.0$$

As the frequency is increased, progress is made round the curve from A to B to C and at C, $F=\infty$. Both A and C are on the ordinate through the origin on the $$\frac{\delta R}{\omega L_0}$$

scale and the dimension AC represents the "filling factor," that is the ratio of the area of cross-section of the metal rod to the effective area of the coil. In the case where the filling factor is 100%, C would be coincident with 0.

For different filling factors a family of curves is obtained which can be used to represent the behaviour of any specimen. For a given value of the filling factor, progress along the corresponding curve from the point A is determined by a parameter which is a function of the test frequency and the dimensions, conductivity, and permeability of the specimen. This parameter and the filling factor uniquely determine a point on the graph and if they are known the impedance of the test coil at the particular frequency can be derived from the co-ordinates of this point by a simple calculation. Conversely the plotting of the graph enables information regarding the dimensions and conductivity of the specimen to be obtained.

It is also possible by reference to the Förster graph to select an operating frequency to provide maximum discrimination between change of conductivity, leading to movement around the curve ABC, and change of dimension, leading to movement away from the curve ABC on to another curve, as the specimen is moved through the test coil at a fixed frequency, and to select an optimum test coil diameter. The optimum test frequency will naturally differ dependent on the physical properties of the test piece to be measured and its relation to all the other parameters.

In order to determine the values of the resistance and inductance of the test coil, a bridge circuit has been used, any change in the specimen resulting in an out-of-balance vector of the bridge which is indicated on two separate meters. The bridge may be an alternating current bridge having two or four reactive arms, one of which contains the specimen coil. This out-of-balance vector is only related to the values of the resistance and inductance of the specimen coil through a complicated formula involving the parameters of the bridge and usually also the frequency.

Thus with known apparatus laborious and slow bridge measurements have been required from which the required values of resistance and inductance were calculated. Finally, the results have to be plotted on graph paper.

According to the invention of British Patent No. 836,-723, apparatus for achieving the desired object comprises a variable frequency oscillation generator connected to feed a test signal to a test coil within which a specimen to be tested can be disposed, the arrangement being such that the current through the test coil is inversely proportional to the frequency of the test signal, a phase-sensitive circuit arrangement responsive to resistive and reactive component signals corresponding to the voltages developed across the series resistive and reactive components of the impedance of the test coil to generate deflection signals respectively proportional to the ratio of the change in series resistance of the test coil to the frequency of the test signal and to the series inductance of the test coil and connected to apply these deflection signals to deflect the electron beam of a cathode ray tube in two mutually perpendicular directions.

In this way the desired curve can be automatically displayed on the face of the cathode ray tube.

A subsidiary and optional feature of the invention of this British patent is that the said circuit arrangement comprises a resistor and a high-Q inductor connected in series across the output from the oscillation generator, the reactance of the inductor within the test frequency range being much greater than the resistance of the resistor whereby the current through the resistor is substantially inversely proportional to the frequency, and an amplifier arranged to amplify the signal voltage across the resistor and apply it as a correction signal for the generation of the corresponding deflection signal from the resistive component signal.

The construction of an inductor having the specified characteristics presents certain practical difficulties when the apparatus is intended to be used over a wide range of frequencies, for example 50 c./s. to 10 kc./s., as in one of the embodiments described, and it is an object of the present invention to provide an alternative way of carrying into effect the invention of the British patent which does not require such an inductor.

According to the present invention there is provided apparatus for the electromagnetic testing of materials including a test coil within which the specimen to be tested can be located, means for establishing in the test coil in response to a test signal applied to the coil an alternating current inversely proportional to the frequency of the test signal, and means for deriving from the coil and applying to deflect the electron beam of a cathode ray tube in mutually perpendicular directions a signal proportional to the inductive component of the impedance of the test coil and a signal proportional to the ratio of the change in the resistive component of the impedance of the test coil to the said frequency, in which the said means for establishing an alternating current in the test coil comprises a variable-frequency oscillation generator connected across the series combination of a resistor and a capacitor, the resistance of the resistor being much greater than the reactance of the capacitor within the test frequency range whereby, in operation, the current through the resistor and capacitor is substantially independent of frequency and a voltage signal inversely proportional to the frequency is developed across the capacitor, and means for applying the said voltage signal to the series combination of the test coil with a resistor having a resistance large compared with the reactance of the test coil within the test frequency range whereby, in operation, the current through the test coil is substantially linearly dependent on the said voltage signal regardless of the frequency and is thus substantially inversely proportional to the frequency.

In the accompanying drawings:

FIG. 1, already referred to, is an explanatory diagram, and

Figure 2:
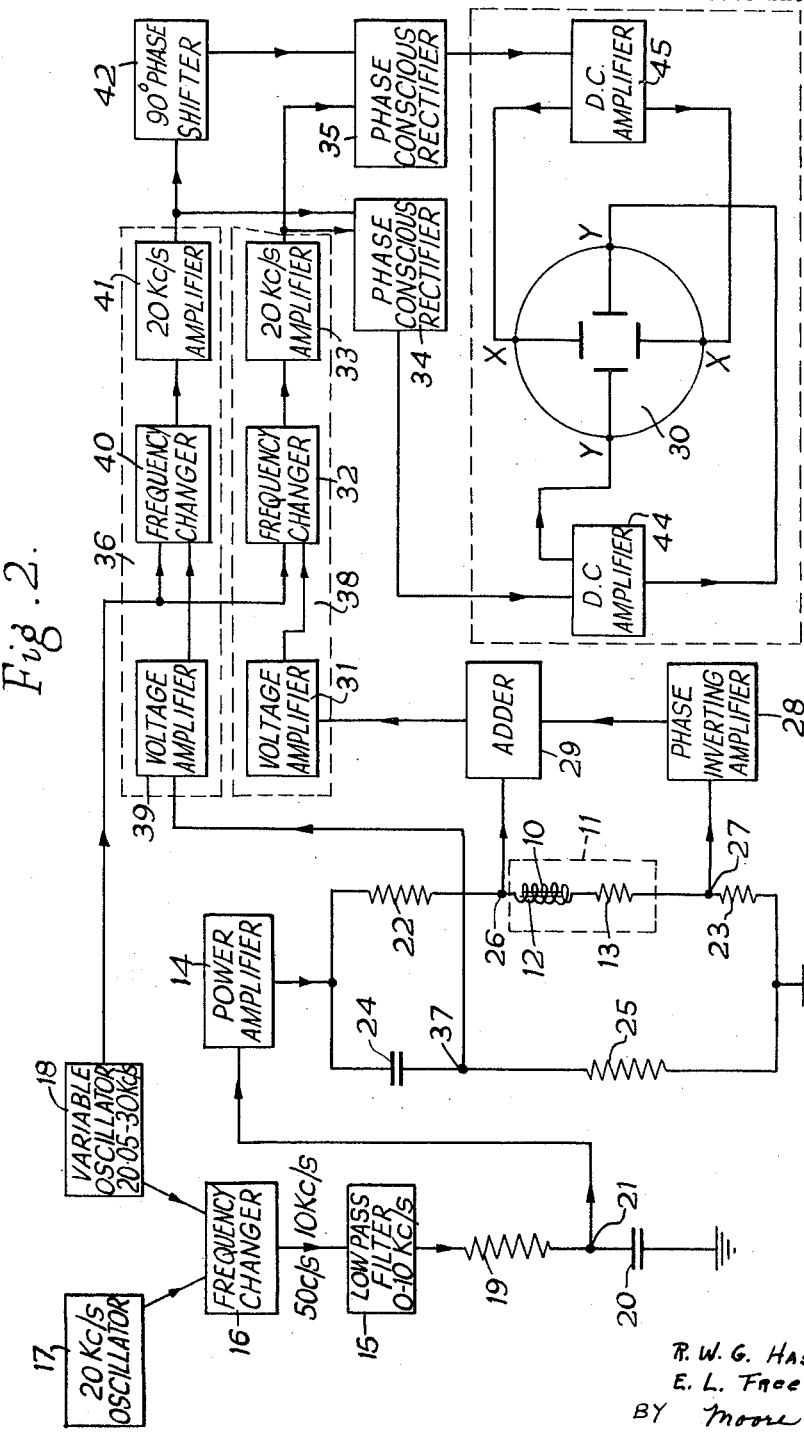

FIG. 2 is a circuit diagram of apparatus for the electromagnetic testing of materials in accordance with the invention.

Referring now to FIG. 2, the specimen 10 to be tested is placed within the turns of a test coil 11. The series inductance of the test coil 11 is represented by an inductor 12 of value L and the resistance by a resistor 13 whose resistance is composed of a D.C. resistance component (constituting the zero frequency resistance) $R_0$ and a variable resistance component $\lambda R$ depending on the frequency of an applied test signal and the characteristics of the specimen 10. The test signal is applied through an amplifier 14 and a low-pass filter 15 from a frequency changer mixer 16 fed by a fixed-frequency oscillator 17 and a variable-frequency oscillator 18. The oscillator 17 is of high stability and supplies oscillations of fixed frequency, 20 kc./s. being assumed by way of example in this embodiment. The output from the oscillator 18 is variable over a range of frequencies from 20.05 to 30 kc./s. and is mixed with that from the oscillator 17 to provide test signals of constant amplitude with a frequency variable from 50 c./s. to 10 kc./s. The low-pass filter 15 ensures that no higher frequencies are applied to the test coil 11.

The output from the filter 15 is applied to a resistor 19 and a capacitor 20 in series. The resistance of the resistor 19 is made much greater than the impedance of the capacitor 20 over the operating frequency range so that the current through the resistor 19 and capacitor 20 is approximately inversely proportional to this resistance and independent of the frequency. This approximation is true to within 1% if the resistance is greater than ten times the impedance at the lowest frequency. Thus the voltage developed across the capacitor 20, which is given by the product of the current and the impedance of the capacitor, the latter being inversely proportional to the frequency, is inversely proportional to the frequency of the signal applied from the filter 15. This voltage signal is taken from the terminal 21 of the capacitor 20, amplified in the power amplifier 14, and applied to two parallel arms, one containing the test coil 11 in series with a resistor 22 and a correction resistor 23 and the other comprising a capacitor 24 in series with a resistor 25.

The resistor 22 has a resistance at least two orders greater than the reactance of the test coil 11 at the highest test frequency so that the current through the test coil is approximately directly proportional to the applied voltage from the amplifier 14 and thus inversely proportional to the frequency of the test signal. That is to say the current I in this arm can be expressed as $$\frac{K}{\omega}$$

where K is a constant determined by the values of the circuit elements and $\omega$ is the angular frequency of the test signal ($\omega = 2\pi f$, where $f$ is the frequency). Thus the voltage $V_1$ developed between the input terminal 26 of the test coil 11 and earth, across the inductor 12 of value L, the resistor 13 of value $R_0 + \pi R$, and the correction resistor 23 having a resistance r of the same order as $R_0$, is given by $$V_1 = I(j\omega L + R_0 + \delta R + r)$$
$$= \frac{K}{\omega}(j\omega L + R_0 + \delta R + r)$$

while the voltage $V_2$ across the resistor 23 between terminal 27 and earth is given by $$V_2 = \frac{K}{\omega} r$$

The voltage $V_2$ is passed through a phase-inverting amplifier 28 of gain $$\frac{R_0 + r}{r}$$

to an adder circuit 29 to which the voltage $V_1$ is fed from the terminal 26. The output from the adder circuit 29 resulting from the subtraction due to phase inversion in the amplifier 28 is thus $$V_1 - \frac{R_0 + r}{r} V_2 = K\left(jL + \frac{\delta R}{\omega}\right)$$

The two components of this output signal, respectively proportional to the inductive component of the impedance of the test coil and to the ratio of the change in the resistive component of the impedance of the test coil to the frequency, represent the signals to be applied to deflect the beam of a cathode ray tube 30 in two mutually perpendicular directions in order to display a Förster graph.

In order to separate the two components, the output from the adder circuit 29 is fed through a voltage amplifier 31, a frequency changer 32 in which it is mixed with the signal of variable frequency from the oscillator 18 to produce a fixed frequency, 20 kc./s., signal, and a 20 kc./s. amplifier 33 to two phase-conscious rectifiers 34 and 35.

The phase reference signals for the rectifiers 34 and 35 are derived from the arm 24, 25, which is in parallel with the arm containing the test coil 11, through a reference chain 36. The capacitor 24 in this arm has a reactance at the highest test frequency about two orders greater than the resistance of the resistor 25 and the current I' in this arm is thus capacitive in character and given approximately by $$I' = \frac{K}{\omega} \times \omega C = KC$$

where C is the capacity of the capacitor 24. The current is thus independent of the frequency and leads the applied voltage $$\left(\frac{K}{\omega}\right)$$

by approximately 90°, the maximum error being only 0°34′ when the reactance of the capacitor 24 is a hundred times the resistance of the resistor 25. The voltage across the resistor 25 between the terminal 37 and earth is thus of substantially constant amplitude, independent of the frequency of the test signal, and is in antiphase with the inductive component of the output from the adder circuit 29. This voltage is fed to the reference chain 36, which is identical with the signal chain 38 constituted by the amplifier 31, frequency changer 32, and amplifier 33, and consists of a voltage amplifier 39, a frequency changer 40 fed with a variable frequency signal from the oscillator 18, and a 20 kc./s. amplifier 41. The output from the reference chain 36 is fed direct to the phase-conscious rectifier 34 and through a 90° phase-shifting network 42 to the phase-conscious rectifier 35.

The outputs from the phase-conscious rectifiers 34 and 35, which are proportional to the inductive and resistive components of the output from the adder circuit 29, are applied through respective D.C. amplifiers 44 and 45 to the X and Y plates respectively of the cathode ray tube 30.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. Apparatus for the electromagnetic testing of materials including a test coil within which the specimen to be tested can be located, means for establishing in the test coil in response to a test signal applied to the coil an alternating current inversely proportional to the frequency of the test signal, and means for deriving from the coil and applying to deflect the electron beam of a cathode ray tube in mutually perpendicular directions a signal proportional to the inductive component of the impedance of the test coil and a signal proportional to the ratio of the change in the resistive component of the impedance of the test coil to the said frequency, in which the said means for establishing an alternating current in the test coil comprises a variable-frequency oscillation generator connected across the series combination of a resistor and a capacitor, the resistance of the resistor being much greater than the reactance of the capacitor within the test frequency range whereby, in operation, the current through the resistor and capacitor is substantially independent of frequency and a voltage signal inversely proportional to the frequency is developed across the capacitor, and means for applying the said voltage signal to the series combination of the test coil with a resistor having a resistance large compared with the reactance of the test coil within the test frequency range whereby, in operation, the current through the test coil is substantially linearly dependent on the said voltage signal regardless of the frequency and is thus substantially inversely proportional to the frequency.

2. Apparatus as claimed in claim 1 including a reference circuit adapted to provide a reference signal in phase with the current in the test coil and a reference signal in phase quadrature therewith and means for combining the reference signals with the output voltage signal from the test coil to separate the resistive and inductive components of the output signal.

3. Apparatus as claimed in claim 2 in which the reference circuit includes a reference arm in parallel with the test coil and its associated high value resistor to which the voltage signal inversely proportional to frequency is applied and which comprises a capacitor and a resistor of such relative values that the phase of the current in the reference arm is determined by the capacitor and its magnitude is independent of frequency and means for deriving the reference signals from the resistor of the reference arm.

4. Apparatus as claimed in claim 3 in which the said means for deriving the reference signals includes a reference chain comprising a fixed-frequency amplifier and a frequency changer for converting the signal from the resistor of the reference arm to the frequency of the fixed-frequency amplifier, the apparatus including a signal chain comprising a similar frequency changer and fixed-frequency amplifier connected to receive the output voltage signal from the test coil, and a variable frequency oscillator connected to supply the two frequency changers and also to supply a further frequency changer for generating the test signal from a signal at the fixed frequency of the amplifiers.

5. Apparatus as claimed in claim 4 including two phase conscious rectifiers connected to the fixed-frequency amplifier of the signal chain, one being also connected direct to the reference chain and the other being connected to the reference chain through a 90° phase-shifting circuit, the outputs of the two rectifiers being coupled to respective pairs of plates of the cathode ray tube.

6. Apparatus as claimed in claim 1 including a correction resistor connected in series with the test coil, means for amplifying the voltage developed across the correction resistor and combining it with the voltage developed across the test coil to eliminate the component of that voltage due to the zero-frequency resistance of the test coil.

References Cited in the file of this patent

UNITED STATES PATENTS

| | | |
|---|---|---|
| 2,489,920 | Michel | Nov. 29, 1949 |
| 2,928,043 | Foerster | Mar. 8, 1960 |
| 2,945,176 | Irwin | July 12, 1960 |

FOREIGN PATENTS

| | | |
|---|---|---|
| 836,723 | Great Britain | June 9, 1960 |